United States Patent [19]

Hatcher

[11] Patent Number: 4,946,120
[45] Date of Patent: Aug. 7, 1990

[54] SUPPORT

[75] Inventor: David O. Hatcher, Williamsville, N.Y.

[73] Assignee: Posting Equipment Corporation, Buffalo, N.Y.

[21] Appl. No.: 230,331

[22] Filed: Aug. 9, 1988

[51] Int. Cl.⁵ .................................................. F16M 11/00
[52] U.S. Cl. ..................................... 248/183; 248/349; 248/289.1; 108/44; 297/468
[58] Field of Search ............ 248/183, 349, 503, 503.1, 248/499, 510, 289.1, 296, 278, 279, 454; 108/44, 139, 103; 312/235 A; 297/468

[56] References Cited

U.S. PATENT DOCUMENTS

| 1,618,374 | 2/1927 | Faust | 108/139 X |
|---|---|---|---|
| 2,650,105 | 8/1953 | Costikyan | 248/505 X |
| 3,063,064 | 11/1962 | Mace | 108/44 X |
| 3,323,772 | 6/1967 | Dupree et al. | 248/499 |
| 3,326,445 | 6/1967 | Goings . | |
| 3,338,629 | 8/1967 | Drees | 248/451 X |
| 3,632,158 | 1/1972 | Boothe . | |
| 3,893,569 | 7/1975 | Hoch | 108/44 X |
| 3,922,973 | 12/1975 | Sturgeon . | |
| 3,934,771 | 1/1976 | Eberhard . | |
| 4,053,133 | 10/1977 | Kauffman . | |
| 4,097,012 | 6/1978 | McIntyre | 248/278 X |
| 4,146,159 | 3/1979 | Hemmen . | |
| 4,341,418 | 7/1982 | Chappell . | |
| 4,508,307 | 4/1985 | Morales | 248/454 X |
| 4,512,503 | 4/1985 | Gioso . | |
| 4,619,386 | 10/1986 | Richardson | 108/44 X |
| 4,758,020 | 7/1988 | Boyd | 297/468 X |

FOREIGN PATENT DOCUMENTS 1963883 6/1971 Fed. Rep. of Germany ........ 108/44

OTHER PUBLICATIONS

"Laptop Car Seat Instructions", Zirco, Inc., 10900 W. 44th Ave., Wheat Ridge, Co., pp. 1-2.

Primary Examiner—Karen J. Chotkowski
Attorney, Agent, or Firm—Hodgson Russ Andrews Woods & Goodyear

[57] ABSTRACT

A support (10) for securing a lap type computer (14) to a car seat (12). The support has upper and lower pivotally interconnected units (32, 30 respectively), the lower unit carrying a belt (54) so that it may be belted to the car seat (12). The upper unit also carries a belt (54) for the purpose of securing the lap top computer to the upper unit. In order to provide for suitable adjustment of the computer for ease of viewing and use, the lower unit is provided with a pair of opposed downwardly extending legs (42 and 44, 46), one of which legs (44, 46) may be secured in various positions of vertical adjustment. The upper unit and lower unit are provided with means (74, 76, 78, 80) to secure the upper unit in various positions of swiveling adjustment. In addtion, the upper unit is provided with a vertically adjustable auxiliary suppport (34) so that the angle of inclination of the lap type computer may be varied. The support may additionally be provided with a writing surface attachment which may be mounted on the upper unit, or alternatively, a writing surface unit may be substituted for the upper unit (32).

10 Claims, 3 Drawing Sheets

SUPPORT

TECHNICAL FIELD

The present invention relates generally to a support, and more particularly to a support which is adapted to secure a lap type computer to a car seat in such a manner that it may be readily utilized by the user, and which will be secure when the car is underway.

BACKGROUND OF THE INVENTION

In recent years a form of computer has been developed which is generally referred to as a portable computer or a lap top computer. This form of computer is easily portable, and is provided with an LCD screen. Route salesmen may use such a computer to review a data base before visiting a customer. Since the route salesmen typically utilize cars it is desirable that a computer support be developed wherein the computer may be utilized with the car and held in a secure manner while the car is in use.

OBJECTS AND SUMMARY OF THE INVENTION

It is an object of the present invention to provide a support wherein a portable or lap type computer may be secured to the, support, the support in turn being secured to a car seat so that the support is secure during operation of the car.

More particularly, it is an object of the present invention to provide a support for securing a lap type computer to a car seat, which support has various features of adjustment so that the computer may be properly positioned for ease of use and viewing by the user of the computer.

The above objects and other objects of this invention are accomplished by providing a support having upper and lower pivotally interconnected units, the lower unit carrying a belt so that it may be belted to the car seat, and the upper unit in turn carrying a belt for the purpose of securing the lap top computer to the upper unit. In order to provide for suitable adjustment of the computer for ease of viewing and use, the lower unit is provided with a pair of opposed downwardly extending legs, one of which legs may be secured in various positions of vertical adjustment. The upper and lower units, which are pivotally interconnected to each other for swiveling movement of the upper unit with respect to the lower unit, are provided with means to secure the upper unit in various positions of swiveling adjustment. In addition, the upper unit is provided with a vertically adjustable auxiliary support so that the angle of inclination of the lap type computer may be varied.

The foregoing will become more apparent after a consideration of the following detailed description taken in conjunction with the accompanying drawings in which a preferred form of this invention is illustrated.

DETAILED DESCRIPTION

Figure 1:
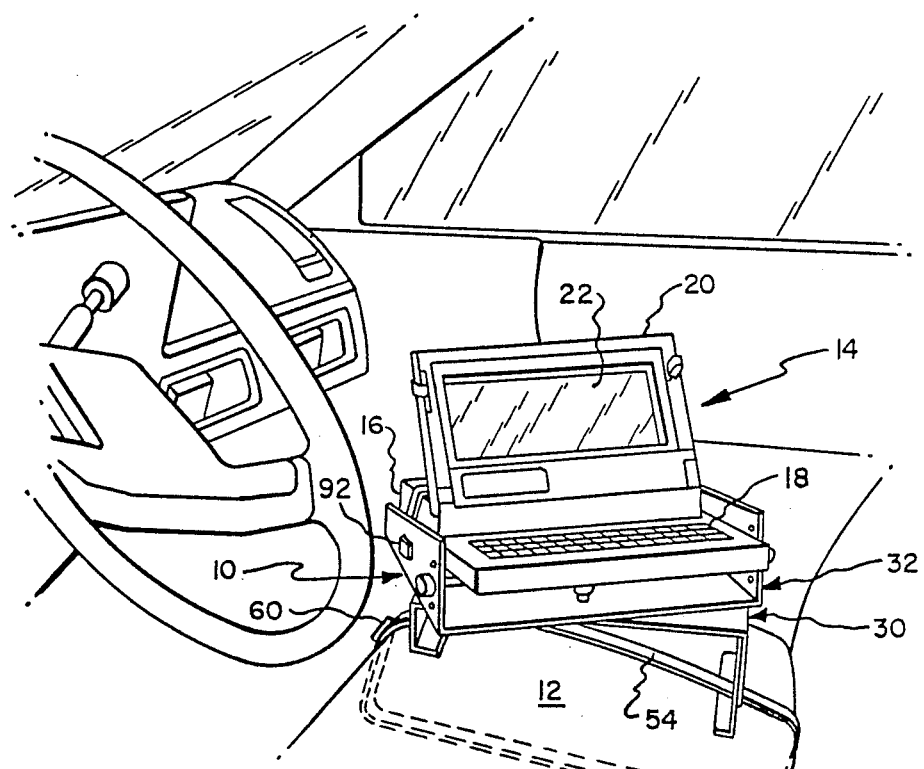
FIG. 1 is a perspective view showing the support of this invention mounted within a car, and a lap type computer mounted upon the support.

With reference to the drawings, the support of this invention is indicated generally at 10. As shown in FIG. 1, the support is shown mounted on a car seat 12, a portable or lap top computer, indicated generally at 14, being mounted thereon. This type of computer is typically provided with a rigid base 16 which extends the length of the computer, a forward portion of the base being provided with a keyboard 18. Hinged to the base is a keyboard cover 20 which is provided with an LCD screen 22. This form of computer construction is well-known in the art. Such computers today typically have 512K or more Random Access Memory (RAM) and either one or two disk drives. When used by a route salesman, a disk is frequently loaded with customer data base information and the route salesman can access this information prior to visiting a customer, and this information can be updated after the route salesman's call, in addition to the route salesman entering orders. Therefore, as pointed out above, it is desireable that the computer be mounted in the car for ready access by the user of the computer or route salesman.

Figure 2:
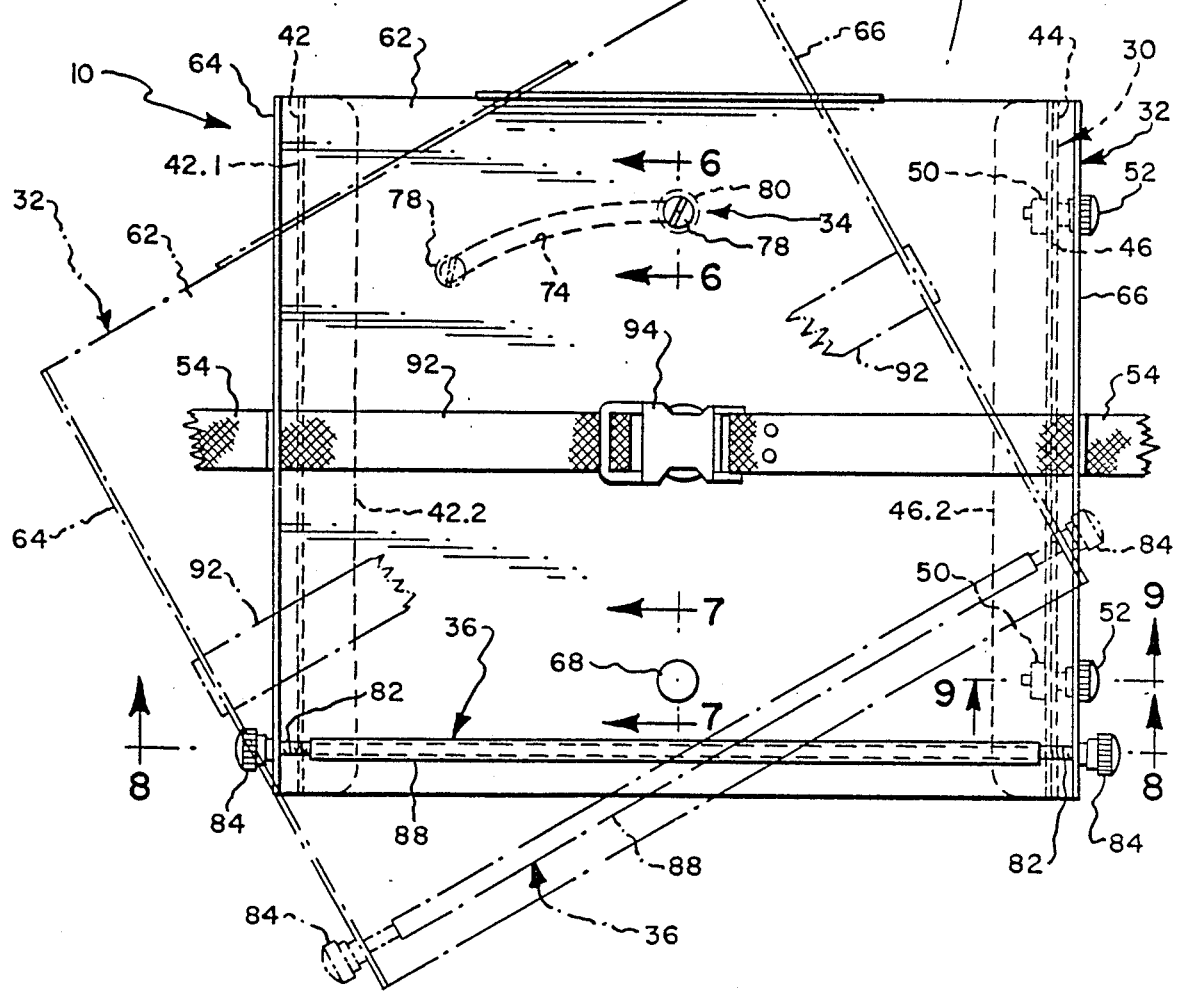
FIG. 2 is a plan view of the support shown in FIG. 1, the upper unit of the support being shown in full lines in one extreme position of adjustment, and in broken lines in another extreme position of adjustment.
Figure 3:
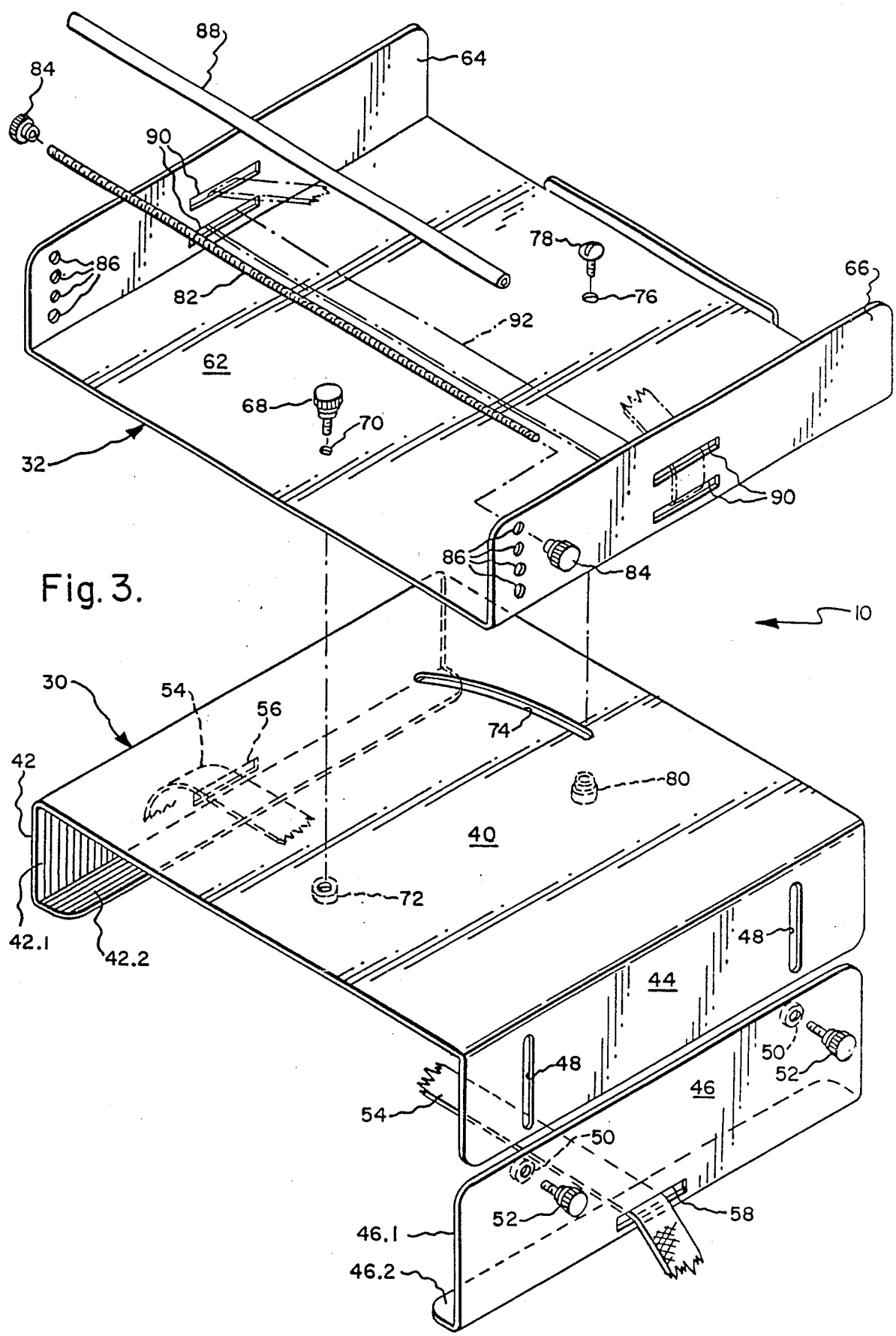
FIG. 3 is an exploded isometric view of the support shown in FIG. 2.
Figure 4:
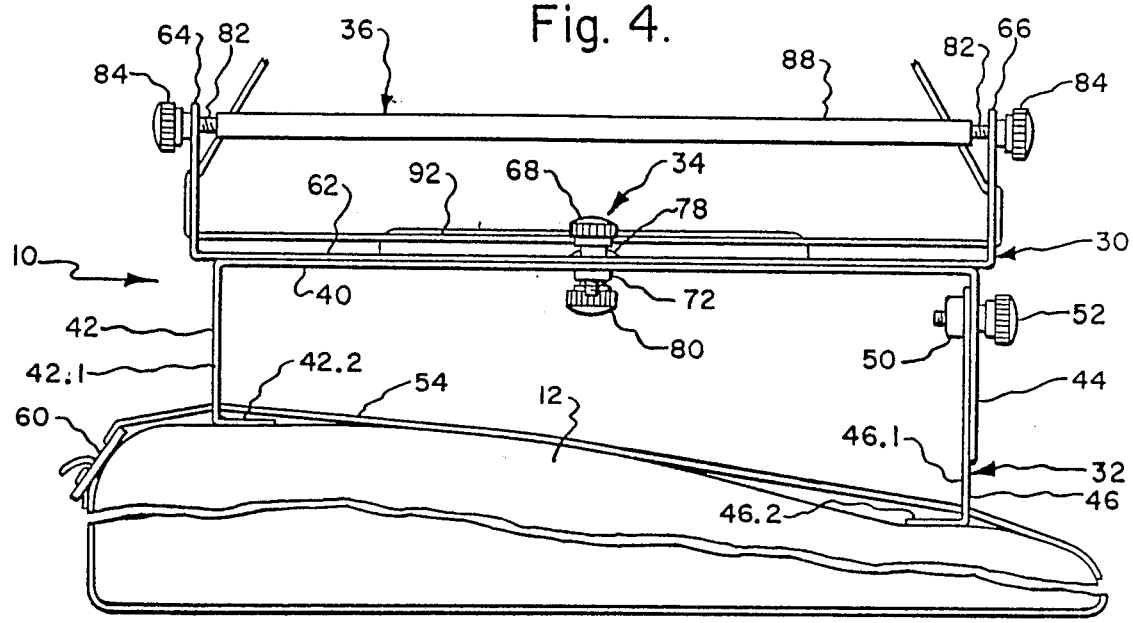
FIG. 4 is a side view of the support showing the manner in which it is mounted on a car seat.
Figure 5:
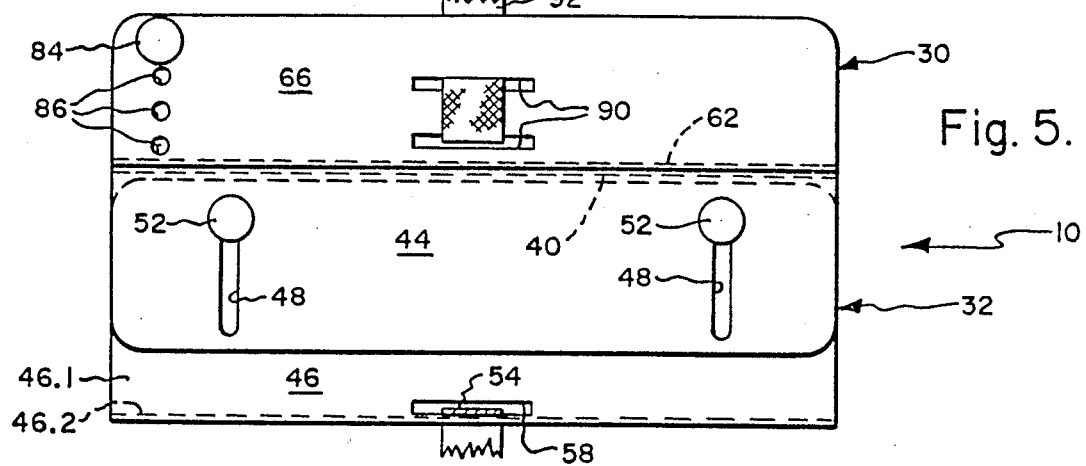
FIG. 5 is a rear elevational view of the support.
Figure 6:
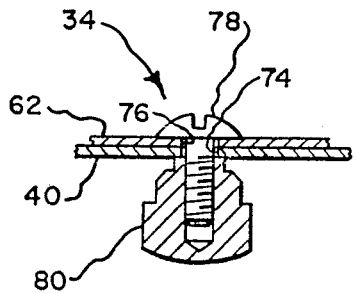
FIGS. 6, 7, 8 and 9 are sectional views taken generally along the lines 6—6, 7—7, 8—8, and 9—9 in FIG. 2.
Figure 7:
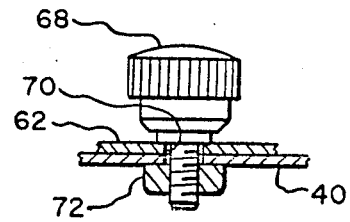
Figure 9:
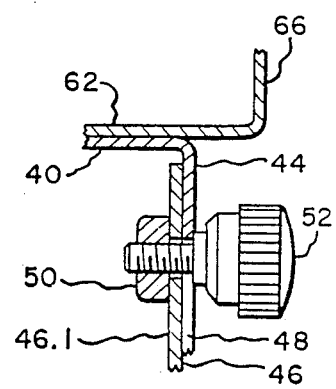
Figure 8:
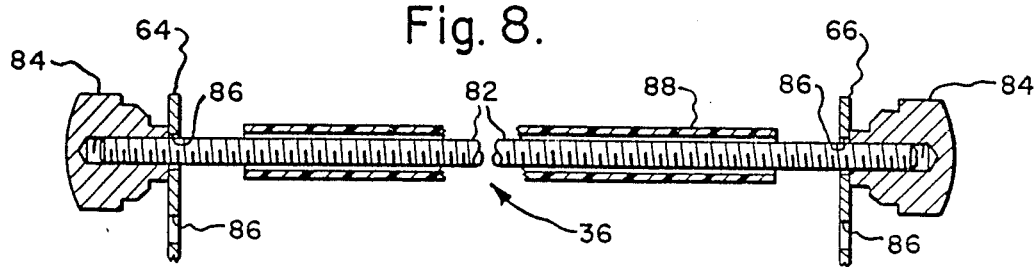

Referring now in greater detail FIGS. 2 to 4, the support of this invention consist of a number of major components, these being a lower unit, indicated generally at 30, and an upper unit, indicated generally at 32, which is mounted upon the lower unit by pivot means, indicated generally at 34 in FIG.4, for adjaustable swiveling positioning. Mounted upon the upper unit is a vertically adjustable auxiliary support, indicated generally at 36. In addition to these major components, first and second holding means are provided to hold the lower unit 30 to the car seat 12, and to hold the computer base 16 to the upper unit 32, respectively.

As can best be seen from FIG. 3 the lower unit includes an upper intermediate planar portion 40 formed of sheet metal or the like and a pair of downwardly extending legs. The front leg 42 is preferably formed integrally with the portion 40 and includes a vertical portion 42.1 and a lower rearwardly extending flange portion or foot portion 42.2 which is adapted to rest upon a front edge of the car seat 12. The rear leg 44, 46 is vertically adjustable and is therefore formed of separate components. Thus, the upper portion of the rear leg is a vertically extending member 44 which is formed integrally with the upper intermediate planar portion 40. The lower portion 46 of the rear leg is also formed of sheet metal or the like and includes a vertical portion 46.1 and a foot portion 46.2. In order to provide for vertical adjustment of the rear leg 44, 46 the upper portion is provided with a pair of spaced apart vertical slots 48. In addition, the vertical portion 46.1 of the lower portion of the rear leg is provided with a pair of apertures (no number) which are adapted to be positioned in alignment with the slots 48, fastener receiving means in the form of weld nuts 50 being secured to the portion 46.1 about the apertures. Threaded fasteners 52 are adapted to be passed through the slots 48 and secured within the fastener receiving means 50 to secure the parts together, the threaded fasteners having enlarged knurled heads which can be easily engaged by hand. As can best be seen from FIG. 4 the back of a seat in a car is typically disposed at a lower position than the front of the seat, and the angle may vary from car to car. Therefore it is necessary in order to properly position the computer for use by the operator that the rear leg be adjustable.

First holding means is provided for holding the lower unit 30 onto the seat 12, which first holding means consists of a belt 54, which belt is adapted to be passed through front and rear horizontal slots 56, 58, in portions 42.1 and 46.1, respectively. The belt 54 may be a nylon strap. In any event, the ends of the belt are provided with suitable fastening means or buckling means 60 so that the ends of the belt can be secured to each other with the belt firmly disposed about the car seat.

The upper unit 32 includes a lower intermediate planar portion 62 and a pair of opposed upwardly extending legs, the front leg being indicated at 64 and the rear leg at 66. As can best be seen from FIG. 1 the width of the planar portion 62 between the legs 64 and 66 is of such a width that the base 16 of the lap top computer may be confined between the legs. The upper unit 32, like the lower unit 30 is typically formed from essentially a single piece of sheet metal which is bent into the desired configuration.

The pivot means 34 consists essentially of a threaded fastener 68 having an enlarged head which can be manually engaged, which threaded fastener is adapted to be passed through a suitable aperture 70 in the lower intermediate portion 62 of the upper unit, and then through an aperture (no number) in the upper intermediate planar portion 40 of the lower unit 30, the threaded fastener being received by fastener receiving means in the form of a weld nut 72 secured about the aperture in the lower unit. As the upper unit will be moved between a position wherein the legs are parallel to the seat back to an alternate position shown in broken lines in FIG. 2, it is desirable that the pivot means be positioned relatively close to the operator so that the back of the upper unit 32 does not contact the seat back as the unit is moved to its various positions of adjustment. Thus, the pivot means is disposed adjacent that edge of the lower unit which is adapted to be positioned closest to the user.

In order to hold the upper unit on the lower unit in various positions of swivel adjustment an arcuate slot 74 is formed on the upper intermediate planar portion 40 of the lower unit, and an aperture 76 is formed on the lower intermediate portion 62 of the upper unit 32, which aperture 76 is adapted to be placed in register with the slot 74. A screw 78 is adapted to extend through the aperture 76 and slot 74 and be held by a nut 80. If the lap top computer is not in the proper position for use by the operator, it is only necessary for him to loosen nut 80 and to reposition the upper unit on the lower unit until it is in the desired operating position, at which time he would then retighten nut 80. While a slotted head screw 78 is shown, it should be obvious that this could be replaced by a carriage bolt or any other suitable fastener.

The vertically adjustable auxiliary support means 36 consists essentially of a rod 82. The ends of the rod 82 are threaded and are adapted to receive nuts 84. The rod 82 is disposed in varying positions of vertical adjustment by positioning it in vertically aligned apertures 86, which apertures are disposed at that end of the front and rear legs 64, 66 which is closest to the computer operator. As can be seen from FIG. 1 a lower forward portion of the computer base 16 is adapted to rest upon the rod. In order to protect the base from being scratched and to improve the frictional coeficient between the auxiliary support 36 and the base of the computer, the rod is covered with a soft tube 88 of vinyl, rubber or the like.

In order to secure the computer base to the upper unit 32 each of the legs 64, 66 is provided with a pair of spaced apart parallel horizontally extending slots 90. Second holding means in the form of a belt or strap 92 is adapted to be passed through the slots as best indicated in FIG. 3, the belt 92 being provided with a buckle 94 of conventional design. The particular buckle shown is of the type sold under the model designation "FASTEX #SRI" by ITW Nexus, and covered by U.S. Pat. Nos. 4,150,464 and 4,171,555. While this type of buckle or fastener is desirable, other forms of buckles may also be employed.

The support of this invention is utilized by positioning it on a seat in the manner shown, securing the lower unit 30 by means of lower belt or strap 54. In addition, a seat belt may also be passed underneath the lower unit to secure the rear leg assembly 44, 46 adjacent the back of the seat, this feature not being illustrated in the drawings. If the angle of the support surface 62 is not correct, the length of the adjustable rear leg 44, 46 will now be adjusted to position the support surface 62 at the correct angle for the operator. The upper unit will now be swiveled to its desired position and secured in place by nut 80. The lap type computer will now be mounted on the unit and if the keyboard is either too low or too high the rod 82 will then be adjusted to place it in the proper position. It is now only necessary to strap the computer in place.

While the support of this invention shown in the accompanying drawings and described above has been designed primarily for use with a lap top computer, it should be obvious that the support of this invention can be used for other purposes. Thus, a clip board or equivalent attachment may be provided which can be secured to the upper unit, the support being adjustable so that attachment can be positioned to provide a proper writing surface for the user. Alternatively, a clip board or equivalent unit can be substituted for the upper unit shown and described above. Accordingly, while a preferred structure in which the principles of the present invention have been incorporated is shown and described above, it is to be understood that this invention is not to be limited to the particular details shown and described above, but that, in fact, widely differing means may be employed in the broader aspects of this invention.

What is claimed is:

1. A support capable of mounting a computer on a car seat said support comprising:
    a lower unit adapted to be positioned on the car seat, the lower unit including an upper intermediate planar portion and a pair of opposed downwardly extending legs, one of the downwardly extending legs being provided with adjusting means for varying the length of the one downwardly extending leg so that the upper intermediate planar portion of the lower unit may be disposed in a generally horizontal position;
    first holding means for securing the lower unit to a car seat;

an upper unit which receives a computer, the upper unit including a lower intermediate planar portion and a pair of opposed upwardly extending legs;

vertically adjustable auxiliary support means carried by the upper unit and for adjustably supporting an edge of the computer so that the computer may be positioned for maximum ease of use and viewing;

pivot means pivotally securing the lower intermediate planar portion of the upper unit to the upper intermediate planar portion of the lower so that the upper unit can swivel with respect to the lower unit; and second holding means for securing a computer between the upwardly extending legs and on the lower intermediate planar portion of the upper unit.

2. The support as set forth in claim 1 wherein the first holding means is a lower belt carried by the lower unit, the lower belt being adapted to be passed about the car seat so that ends of the lower belt may be secured together to hold the support on the car seat, each of the downwardly extending legs being provided with a horizontal slot, the belt passing through said slots.

3. The support as set forth in claim 1 wherein the pivot means is disposed adjacent an edge of the planar portion of the lower unit which edge is adapted to be positioned closest to the user.

4. The support as set forth in claim 1 wherein a plurality of vertically aligned apertures are provided adjacent an edge of each of the upwardly extending legs of the upper unit which edge is disposed closest to the computer operator, the vertically adjustable auxiliary support means including a rod which extends through one opposed pair of vertically aligned apertures, and securing means to secure the rod in place in said pair of vertically aligned apertures.

5. The support as set forth in claim 1 or claim 2 wherein the second holding means is an upper belt carried by the upper unit and which is adapted to be passed about the computer, the ends of the upper belt being secured to each other to hold the computer in place.

6. The support as set forth in claim 5 wherein each of the upwardly extending legs of the upper unit is provided with a pair of aligned parallel slots, the upper belt passing through the pair of slots on each leg.

7. The support as set forth in claim 3 wherein the upper intermediate planar portion of the lower unit includes an arcuate slot, and wherein the planar portion of the upper unit is provided with an aperture in alignment with said slot, the support further being characterized by releasable fastening means passing through said slot and aperture for fastening together and holding the upper unit on the lower unit in various positions of adjustment.

8. The support as set forth in claim 4 wherein the ends of the rod are threaded, and the securing means are nuts which are threaded onto the ends of the rod.

9. The support as set forth in claim 4 wherein an intermediate portion of the rod is covered with a soft tube.

10. A support capable of mounting a computer on a car seat, said support comprising:

a lower unit adapted to be positioned on a car seat, the lower unit including upper intermediate planar portion and a pair of front and rear opposed downwardly extending legs, one of said downwardly extending legs being provided with adjustable means so that the length of the one downwardly extending leg may be varied so that the upper intermediate planar portion of the lower unit may be disposed in a generally horizontal position;

holding means in the form of a lower belt carried by the lower unit, the lower belt being adapted to be passed around the car seat so that the ends of the lower belt may be secured together to hold the lower unit on the car seat;

an upper unit which receives a computer, the upper unit including a lower intermediate planar portion and a pair of front and rear opposed upwardly extending legs;

pivot means pivotally securing the lower intermediate portion of the upper unit to the upper intermediate planar portion of the lower unit for swiveling the upper unit with respect to the lower unit so that the computer carried by the upper unit may be properly angled about a vertical axis with respect to the operator;

a vertically adjustable fore and aft extending auxiliary support means carried by the front and rear opposed upwardly extending legs of the upper unit for adjustably supporting one edge of the computer in various positions of vertical adjustment so that the computer may be positioned for maximum ease of use and viewing; and second holding means in the form of an upper belt carried by the upper unit for securing the computer between the upwardly extending legs, the ends of the upper belt being secured to each other to hold the computer in place.

* * * * *